(12) United States Patent
Katoh et al.

(10) Patent No.: US 7,167,290 B2
(45) Date of Patent: Jan. 23, 2007

(54) OPTICAL DEFLECTION DEVICE

(75) Inventors: Seiichi Katoh, Miyagi (JP); Takeshi Nanjo, Miyagi (JP); Koichi Ohtaka, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 197 days.

(21) Appl. No.: 11/020,279

(22) Filed: Dec. 27, 2004

(65) Prior Publication Data
US 2005/0169156 A1    Aug. 4, 2005

(30) Foreign Application Priority Data
Jan. 6, 2004    (JP)    .............................. 2004-001239

(51) Int. Cl.
G02B 26/08    (2006.01)
(52) U.S. Cl. ...................... 359/212; 359/198; 359/199; 359/201; 359/213; 359/214
(58) Field of Classification Search ...................... None
See application file for complete search history.

(56) References Cited

U.S. PATENT DOCUMENTS

| | | | |
|---|---|---|---|
| 6,900,915 B1 * | 5/2005 | Nanjyo et al. ............... | 359/199 |
| 7,050,217 B1 * | 5/2006 | Nanjyo et al. ............... | 359/291 |
| 2002/0109899 A1 | 8/2002 | Ohtaka et al. | |

FOREIGN PATENT DOCUMENTS

| | | |
|---|---|---|
| JP | 6-138403 | 5/1994 |
| JP | 2000-2842 | 1/2000 |
| WO | WO 96/41224 | 12/1996 |
| WO | WO 96/41226 | 12/1996 |

OTHER PUBLICATIONS

K. E. Petersen, "Micromechanical light modulator array fabricated on silicon", Applied Physics Letters, vol. 31, No. 8, Oct. 15, 1977, pp. 521-523.
O. Solgaard, et al., "Deformable grating optical modulator", Optics Letters, vol. 17, No. 9, May 1, 1992, pp. 688-690.
Larry J. Hornbeck, "Deformable-Mirror Spatial Light Modulators", SPIE Critical Reviews Series, vol. 1150, pp. 86-102.

* cited by examiner

*Primary Examiner*—James Phan
(74) *Attorney, Agent, or Firm*—Oblon, Spivak, McClelland, Maier & Neustadt, P.C.

(57) ABSTRACT

An optical deflection device is disclosed that is able to drive a mirror therein to move smoothly. In the optical deflection device, notches are formed in the mirror, and when the notches hit against a bearing member, the mirror is stopped, thus preventing the mirror from being out of position in the horizontal direction. In addition, eaves at the top of the bearing member prevent the mirror from being out of position in the upward direction. Further, a ridge acting as a fulcrum prevents the mirror from being out of position in the downward direction. Moreover, the bearing member limits movement of the mirror in the bearing direction. Therefore, the mirror can rotate smoothly until it hits against the electrodes, and the mirror is rotatable but not out of position.

10 Claims, 21 Drawing Sheets

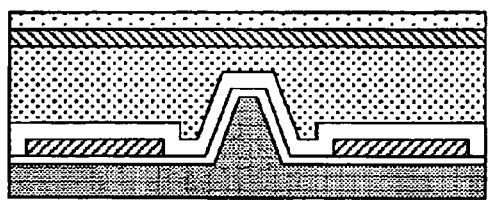
FIG.14A
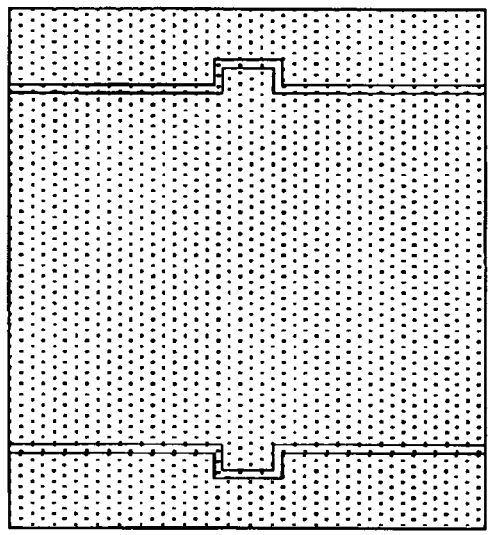
FIG.14B
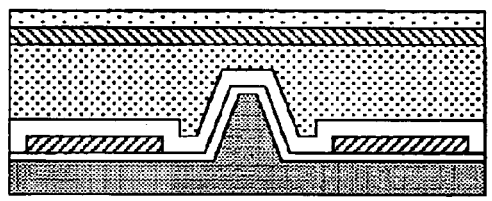
FIG.14C
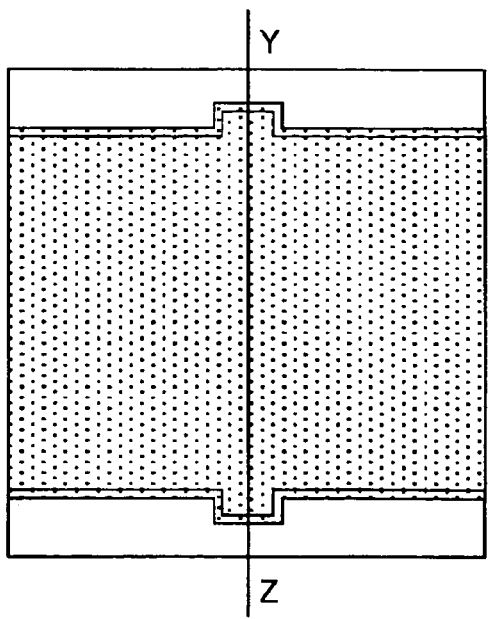
FIG.14D
FIG.14E
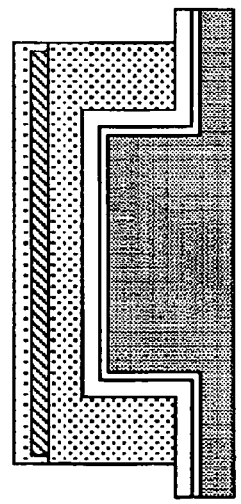

131

OPTICAL DEFLECTION DEVICE

BACKGROUND OF THE INVENTION

1. Field of the Invention

The present invention relates to a method of driving an optical deflection device that changes a direction of outgoing light relative to incident light, and preferably used in an image forming apparatus such as an electrophotographic printer or a copier, or a projection image-video display device such as a projector or a digital theater system.

2. Description of the Related Art

An optical switching device utilizing an electrostatic force and an optical deflection system using the optical switching device were published by K. E. Petersen in 1977 on "Applied Physics Letters, Vol. 31, No. 8, 1977, p521–523" (referred to as reference 1, hereinafter), in which a beam suspended at one end was electrostatically deflected to deflect reflected light so as to realize a switching function. Reference can also be made to Japanese Patent Gazette No. 2941952 (referred to as reference 2, hereinafter), and Japanese Patent Gazette No. 3016871 (referred to as reference 3, hereinafter).

Additionally, an optical switching element including a diffraction grating driven by an electrostatic force was published on "Optics Letters, Vol. 17, No. 9, 1992, p688–690" (referred to as reference 4, hereinafter).

Further, in Japanese Laid Open Patent Application No. 6-138403 (referred to as reference 5, hereinafter), an image forming apparatus using an optical deflection system is proposed in which digital micro-mirror devices (DMD) are arranged one-dimensionally or bi-dimensionally.

Additionally, as an example of the architecture of the above digital micro-mirror device, a digital micro-mirror device having a torsion beam (or cantilever-beam) architecture was published by L. J. Hornbeck in Proceedings of SPIE, Vol. 1150, p 86–102 (referred to as reference 6, hereinafter). The torsion beam (or cantilever-beam) digital micro-mirror device described by L. J. Hornbeck, similar to the present invention, has an inclined mirror portion, but, different from the optical deflection device of the present invention, the mirror portion has at least one fixed end.

Further, Japanese Laid Open Patent Application No. 2000-2842 (referred to as reference 7, hereinafter) discloses an optical deflection device that deflects a beam fixed at its two ends to a cylindrical shape and rapidly deflects the light.

The optical switching device utilizing a suspended beam, as disclosed in reference 1, or the cantilever-beam digital micro-mirror device disclosed in reference 6 suffer from drawbacks in that it is difficult to maintain stability of the beams, and the responding speed cannot be made high.

The torsion beam digital micro-mirror device suffers from a drawback in that the mechanical strength of the hinge (that is, the torsion beam) degrades after long-term use.

The optical switching devices disclosed in references 2 and 3 suffer from a drawback in that the wavelength of the incident light is limited.

The optical switching device disclosed in reference 7, which has a parallel gap between electrodes, and in which the beam fixed at two ends is deflected to a cylindrical shape, has the advantage in that it is capable of rapid deflection and thus high-speed response; however, because two ends of the beam are fixed, its driving voltage cannot be made low compared with the optical switching device utilizing a suspended beam, the cantilever-beam digital micro-mirror device, or the torsion beam digital micro-mirror device.

The above optical switching devices disclosed in the related art are of the suspended-beam type, torsion beam type, cantilever-beam type, or two-ends-fixed beam type. These optical switching devices of the related art have two or three electrodes. When the planar electrodes facing each other are set to be at different potentials, an electrostatic attracting force is generated, and this electrostatic force displaces mirror surfaces, thus performing operations of optical deflection.

Different from the above optical deflection devices, the present invention relates to an optical deflection device which includes plural electrodes (typically, four electrodes) formed on the same plane, and an electrically floating plate-shaped member (for example, a mirror) having a conductive layer and facing the electrodes. When a voltage is applied on adjacent electrodes, the potential of the electrically floating plate-shaped member becomes arbitrary, and an electrostatic attracting force is generated to act on the plate-shaped member. The electrostatic attracting force tilts and displaces the plate-shaped member, which has a mirror surface with a fulcrum member at its center, thus performing operations of optical deflection.

Usually, in the operation of driving such an optical deflection device, the mirror, as the plate-shaped member, is allowed to move, driven by a voltage in a specified region to deflect a reflection direction of incident light, then the voltage is removed to be set to its original value, and the mirror returns back to its original position due to the rigidity thereof.

Hence, in order that the mirror is not out of position, the movement of the mirror should be limited, and for this purpose, an end of the mirror is fixed by a rigid member. To utilize the rigidity, the rigidity is set to be large when thee driving speed is increased; accordingly, there arises a problem in that the driving voltage also increases. Additionally, because the rigid member has an elastic limit and a breaking limit, the allowed movement region of the mirror is quite limited.

SUMMARY OF THE INVENTION

It is a general object of the present invention to solve one or more problems of the related art.

A more specific object of the present invention is to provide an optical deflection device able to drive a mirror therein to move smoothly.

The optical deflection device of the present invention includes plural electrodes, and a mirror (corresponding to the plate-shaped member) that is displaced by the charge generated on the mirror due to electrostatic induction and by an electrostatic force between the electrodes.

Because rigidity of the mirror is not utilized, a deflection angle is not dependent on an elastic limit and a breaking limit of the rigid member, and can be set freely. For this reason, in the optical deflection device of the present invention, it is important to form a rotational axis of the mirror.

In the optical deflection device of the present invention, displacement of the mirror in a horizontal direction is limited by notches near the center of gravity of the mirror or the linear symmetric axis of the mirror, and displacement of the mirror in an upward direction is limited by an eave that projects, from a member near a side of the mirror, toward the mirror.

In addition, an opening in the mirror is formed near the center of gravity of the mirror or the linear symmetric axis of the mirror, and the displacement of the mirror is limited by a ring-shaped structure that penetrates the opening from the member near the side of the mirror of a supporting member. Thereby, it is ensured that the plate-shaped member has a rotational degree of freedom with the center of gravity as a center.

In addition, a projecting portion is formed on a side surface of the mirror, which projects from the side surface of the mirror near the center of gravity of the mirror or the linear symmetric axis of the mirror. Hence, the displacement of the mirror in the horizontal direction and in the upward direction is limited by the bearing structure, thereby providing a rotational degree of freedom.

According to the present invention, the mirror (corresponding to the plate-shaped member) can smoothly rotate. By forming a notch or an opening in the mirror, or a projecting portion on the sides of the mirror, the mirror can be held at a position along the centroidal line, thus providing a rotational degree of freedom. By making the bearing mechanism transparent, the bearing mechanism does not reflect light, thereby preventing reduction of reflection efficiency.

When plural optical deflection devices are arranged on a substrate, if the bearings of different optical deflection devices are arranged to face each other on the substrate, unused space arises, and this reduces mirror density on the substrate.

According to the present invention, since plural optical deflection devices are arranged on a substrate in a zigzag manner, unused space is reduced and the light reflection efficiency per unit substrate area can be improved.

These and other objects, features, and advantages of the present invention will become more apparent from the following detailed description of preferred embodiments given with reference to the accompanying drawings.

BRIEF DESCRIPTION OF THE DRAWINGS

FIGS. 14A through 14E, continuing from FIGS. 13A through 13E, are cross-sectional views and plan views showing steps of forming the optical deflection device having the projections 132 on the sides of the mirror 106 according to the fourth embodiment of the present invention;

DESCRIPTION OF THE PREFERRED EMBODIMENTS

Below, preferred embodiments of the present invention are explained with reference to the accompanying drawings.

First Embodiment

Figure 1A:
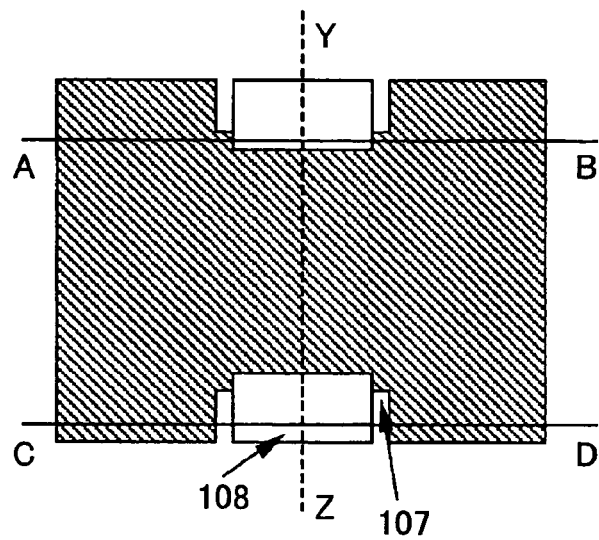
FIGS. 1A through 1F are views schematically showing a first example of a configuration of an optical deflection device according to an embodiment of the present invention.
Figure 1B:
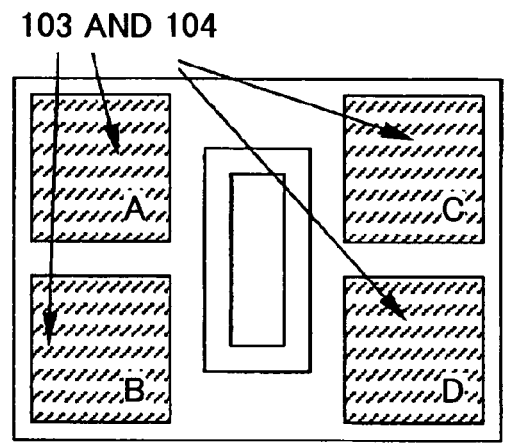
Figure 1C:
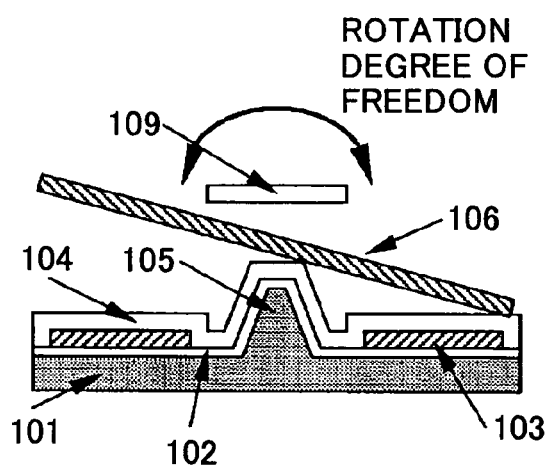
Figure 1D:
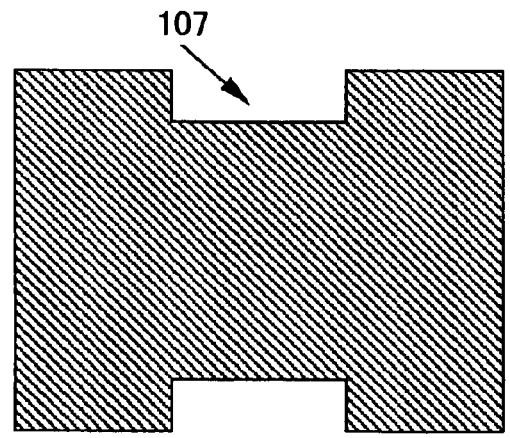
Figure 1E:
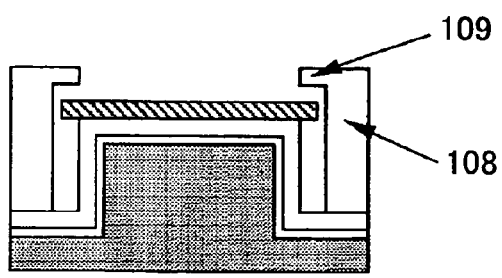
Figure 1F:
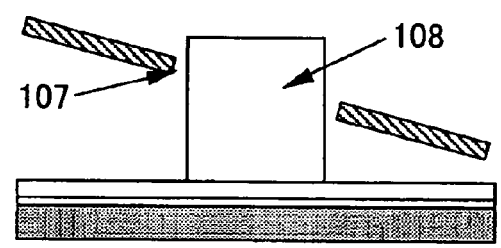

FIGS. 1A through 1F are views schematically showing a first example of a configuration of an optical deflection device according to an embodiment of the present invention, where, FIG. 1A is a plan view of the optical deflection device, FIG. 1B is a plan view of electrodes with a mirror being removed, FIG. 1C is a cross-sectional view of the optical deflection device along the line AB in FIG. 1A, FIG. 1D is a plan view of a mirror, FIG. 1E is a cross-sectional view of the optical deflection device along the line YZ in FIG. 1A, and FIG. 1F is a cross-sectional view of the optical deflection device along the line CD in FIG. 1A.

As illustrated in FIG. 1C, a ridge 105 acting as a fulcrum member is formed on a silicon substrate 101, and both are insulated by an oxide film 102. A number of electrodes 103, for example, four electrodes 103 (also referring to FIG. 1B), are provided, and are covered by an insulating film such as an oxide film 104.

The ridge 105 functions as a fulcrum, and is arranged at a position so that a conductive mirror 106 can be rotationally displaced like a seesaw.

When voltages are applied on the four electrodes A, B, C, D on the substrate, respectively, a charge is induced in the mirror 106, which is a conductive film, by electrostatic induction, and the mirror 106 is attracted toward the electrodes by an electrostatic force.

In order to drive the optical deflection device in FIGS. 1A through 1F to operate, for example, a voltage is applied to the electrodes A and B, and an intermediate voltage is applied to the electrodes C and D, hence, an electrostatic force that attracts the mirror 106 is generated by electrostatic induction due to the electrodes A and B. At this moment, the potential of the mirror 106 is between the potential of the electrode A and the potential of the electrode B. Because the voltage between the electrodes C and D is set in advance to be half of the voltage between the electrodes A and B, there is no electrostatic force acting on the mirror 106 from the side of the electrodes C and D. Hence, the mirror 106 is attracted to the electrodes A and B. As a result, the mirror 106 is tilted to deflect incident light.

Similarly, if a voltage is applied to the electrodes C and D, and an intermediate voltage is applied to the electrodes A and B, the mirror 106 is attracted to the electrodes C and D.

This method of driving the optical deflection device of the present invention is based on Japanese Laid Open Patent Application No. 2002-282858.

In the above method of driving the optical deflection device, in order to make the mirror 106 movable, it is necessary to loosely fix the mirror 106 to an axle so that the mirror 106 is rotatable but not out of position. Further, it is preferable that the axle be at a position on the linear symmetric axis of the mirror 106, and it is preferable that the linear symmetric axis of the mirror 106 be at the ridge 105 that acts as a fulcrum. When the shape of the mirror 106 is asymmetric, it is preferable that a bearing and the ridge 105 be at positions along a centroidal line (a line passing through the center of gravity).

FIGS. 2A through 2F are views schematically showing a second example of the configuration of the optical deflection device according to an embodiment of the present invention.

In FIGS. 2A through 2F, and figures subsequent, the same reference numbers are used for the same elements as those in FIGS. 1A through 1F, and overlapping descriptions are omitted.

In FIGS. 2A through 2F, the shape of the mirror 106 is asymmetric, and the bearing and the ridge 105 are arranged at positions along the centroidal line of the mirror 106.

In the optical deflection device, for example, it may be defined that a tilt of the mirror 106 in a preset direction corresponds to an ON state of the light, and a tilt of the mirror 106 in the opposite direction corresponds to an OFF state of the light. Under this definition, it is possible to provide a reflection area to a certain degree, and obtain a large deflection angle with a low ridge. In such a case, the side of the mirror having a short distance from the ridge may be made thick and heavy so as to adjust the center of gravity of the mirror 106.

Figure 2A:
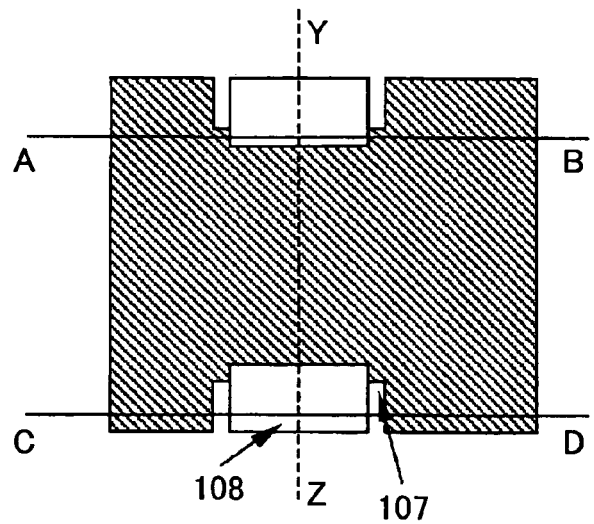
FIGS. 2A through 2F are views schematically showing a second example of the configuration of the optical deflection device according to an embodiment of the present invention.
Figure 2B:
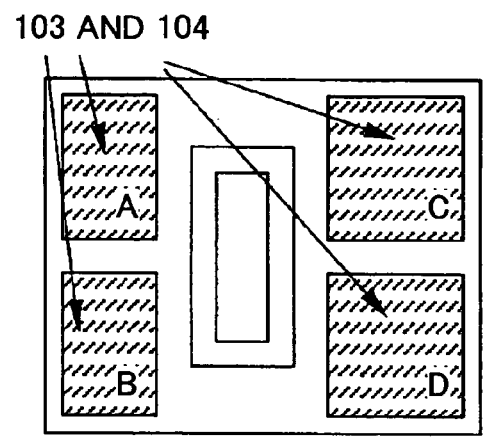
Figure 2C:
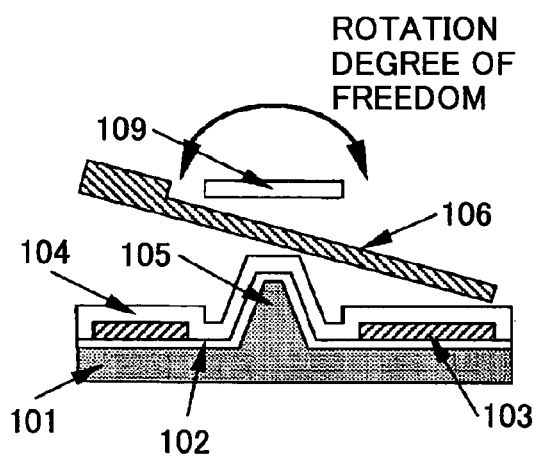
Figure 2D:
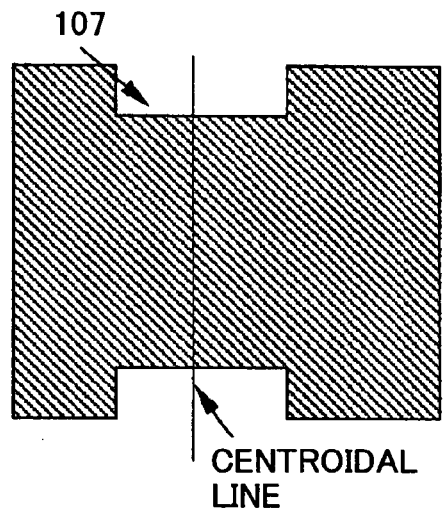
Figure 2E:
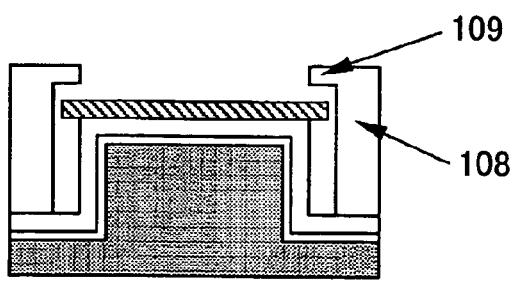
Figure 2F:
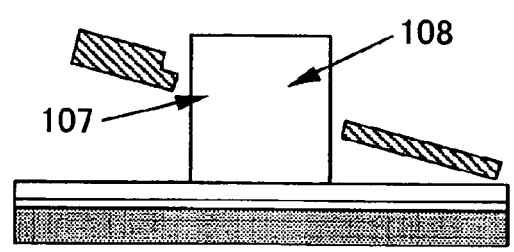

In the optical deflection device according to an embodiment of the present invention, the bearing structure may be formed by forming a notch in the mirror 106, as illustrated in FIG. 1D and FIG. 2D, or by forming openings in the mirror 106 to loosely fix the mirror 106 like a ring, as illustrated in FIG. 3A through FIG. 3F, or by forming projections on the sides of the mirror 106 in the horizontal direction, as illustrated in FIG. 4A through FIG. 4F.

Notches in Mirror 106

As illustrated in FIG. 1F, notches 107 are formed in the mirror 106, and a bearing member 108 and the notches 107 are loosely joined with each other, hence preventing the mirror 106 from being out of position in the horizontal direction.

Additionally, as illustrated in FIG. 1C and FIG. 1E, eaves 109 at the top of the bearing member 108 prevent the mirror 106 from being out of position in the upward direction.

Because the ridge 105 is a fulcrum, it prevents the mirror 106 from being out of position in the downward direction.

As illustrated in FIG. 1E, the bearing member 108 limits movement of the mirror 106 in the bearing direction.

Due to the above bearing structure, the mirror 106 can rotate smoothly until it hits against the electrodes; moreover, the mirror is rotatable but not out of position.

Ring Mechanism in Mirror 106

Figure 3A:
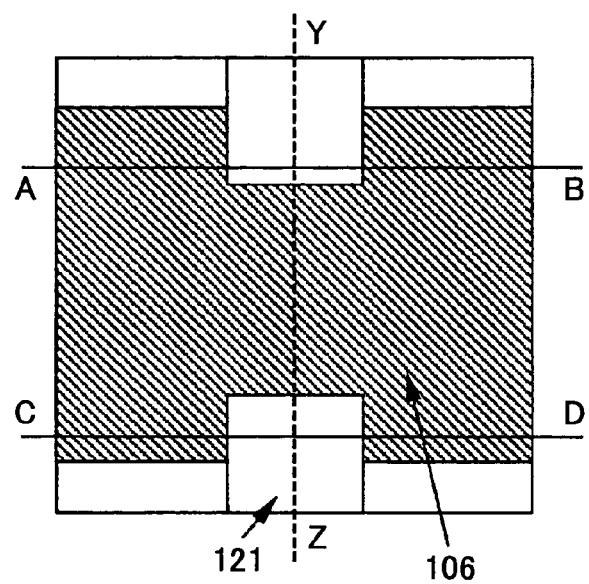
FIGS. 3A through 3F are views schematically showing a third example of the configuration of the optical deflection device according to an embodiment of the present invention.
Figure 3B:
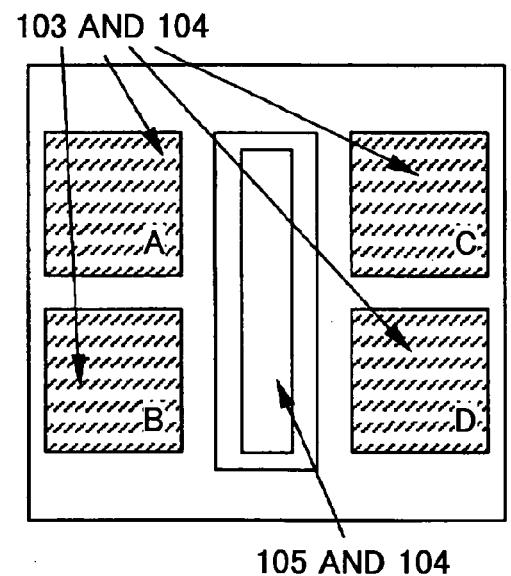
Figure 3C:
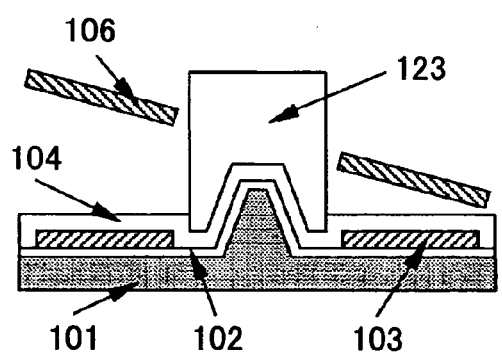
Figure 3D:
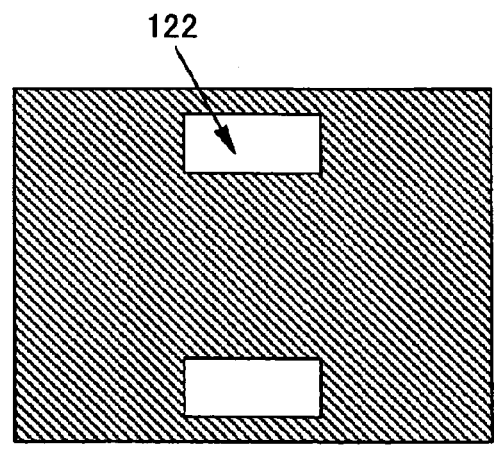
Figure 3E:
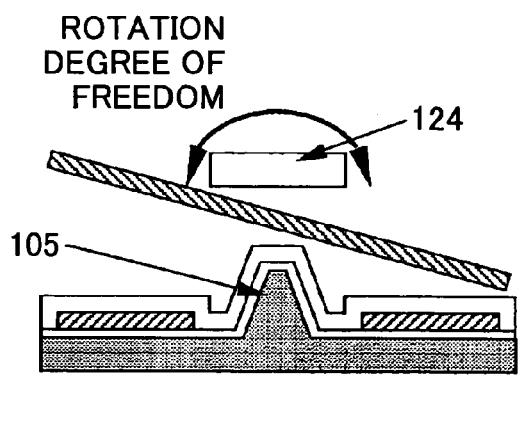
Figure 3F:
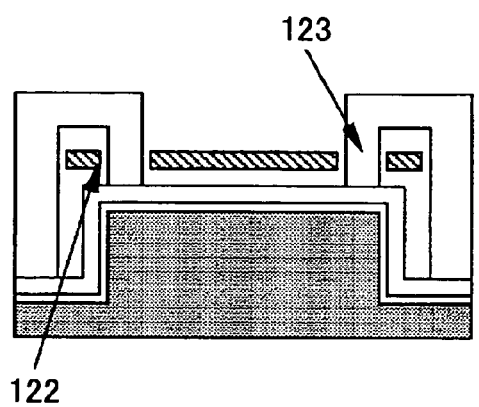

FIGS. 3A through 3F are views schematically showing a third example of the configuration of the optical deflection device according to an embodiment of the present invention, where, FIG. 3A is a plan view of the optical deflection device, FIG. 3B is a plan view of electrodes with the mirror being removed, FIG. 3C is a cross-sectional view of the optical deflection device along the line AB in FIG. 3A, FIG. 3D is a plan view of a mirror, FIG. 3E is a cross-sectional view of the optical deflection device along the line CD in FIG. 3A, and FIG. 3F is a cross-sectional view of the optical deflection device along the line YZ in FIG. 3A.

As illustrated in FIG. 3D, openings 122 are formed in the mirror 106, and a bearing portion 121 is provided which includes a bearing member 123 and a bearing member 124. The bearing portion 121 and the ridge 105 form a ring mechanism. As illustrated in FIG. 3C, displacement of the mirror 106 in the horizontal direction is limited by the bearing member 123, and as illustrated in FIG. 3E, displacement of the mirror 106 in the upward direction is limited by the bearing member 124. Therefore, the ring mechanism formed by the bearing portion 121 and the ridge 105 functions as a bearing mechanism. Additionally, as illustrated in FIG. 3F, the bearing member 123 prevents the mirror 106 from being displaced in the bearing direction.

When the bearing members 123, 124 cover the mirror 106, the reflection efficiency of the mirror 106 may decrease. However, by making the bearing mechanism transparent, the portion of the mirror 106 under the bearing members 123, 124 can be used for light incidence and reflection, thereby, preventing reduction of the reflection efficiency.

Projections on Sides of Mirror 106

Figure 4A:
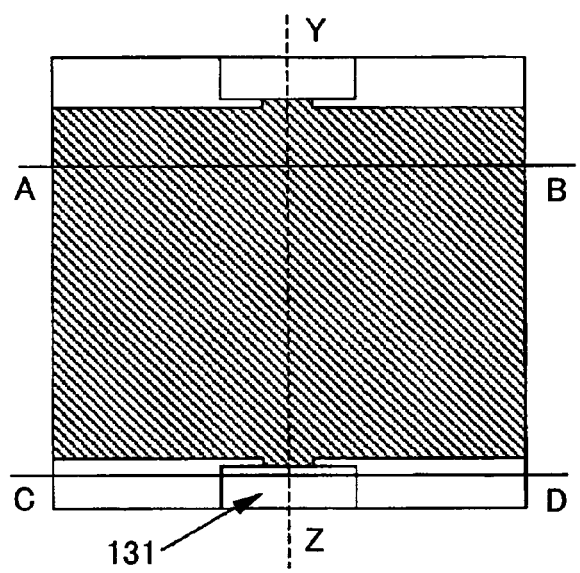
FIGS. 4A through 4F are views schematically showing a fourth example of the configuration of the optical deflection device according to an embodiment of the present invention.
Figure 4B:
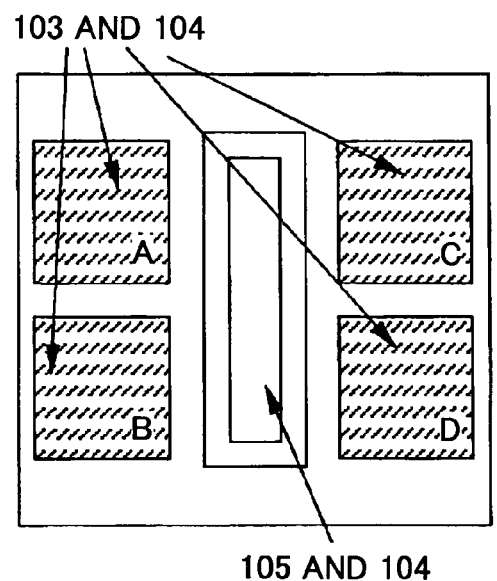
Figure 4C:
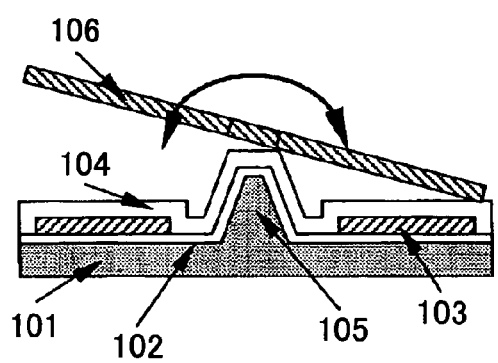
Figure 4D:
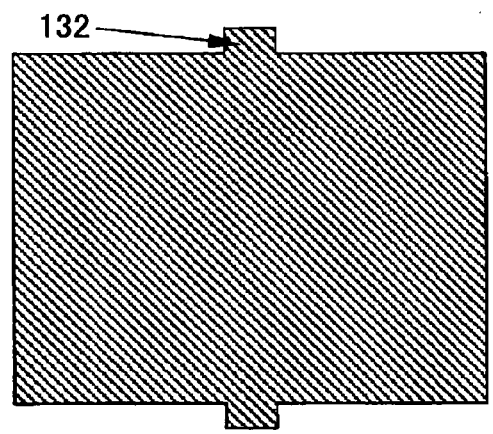
Figure 4E:
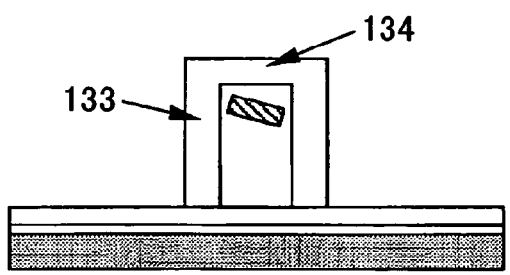
Figure 4F:
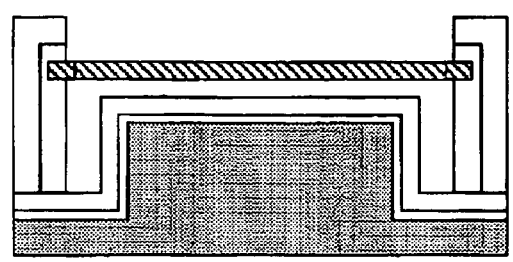

FIGS. 4A through 4F are views schematically showing a fourth example of the configuration of the optical deflection device according to an embodiment of the present invention, where, FIG. 4A is a plan view of the optical deflection device, FIG. 4B is a plan view of electrodes with the mirror being removed, FIG. 4C is a cross-sectional view of the optical deflection device along the line AB in FIG. 4A, FIG. 4D is a plan view of a mirror, FIG. 4E is a cross-sectional view of the optical deflection device along the line CD in FIG. 4A, and FIG. 4F is a cross-sectional view of the optical deflection device along the line YZ in FIG. 4A.

As illustrated in FIG. 4D, projections 132 are formed on the sides of the mirror 106 in the horizontal direction, and a bearing portion 131 (FIG. 4A) surrounds the projections 132. Therefore, as illustrated in FIG. 4E, the projections 132 prevent displacement of the mirror 106 in the upward direction and the horizontal direction, hence functioning as a bearing mechanism. Additionally, as illustrated in FIG. 4F, the projections 132 also prevent the mirror 106 from being displaced in the bearing direction.

Second Embodiment

Below, a typical method of forming notches in the mirror 106 is described with reference to FIGS. 5A through 5E, FIGS. 6A through 6E, FIGS. 7A through 7F, and FIG. 8. In the following description, it is assumed that the mirror is a 20 µm square, and the inclination angle of the mirror is 15°.

Figure 5A:
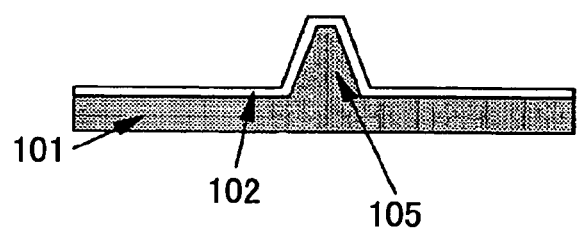
FIGS. 5A through 5E are cross-sectional views showing steps of forming the optical deflection device having notches in the mirror according to a second embodiment of the present invention.
Figure 5B:
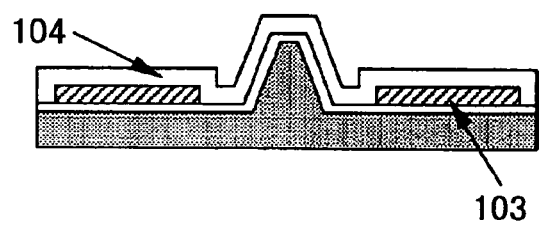
Figure 5C:
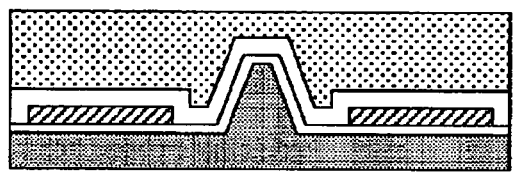
Figure 5D:
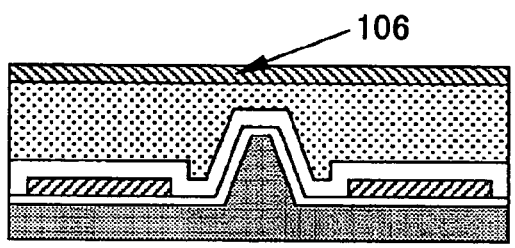
Figure 5E:
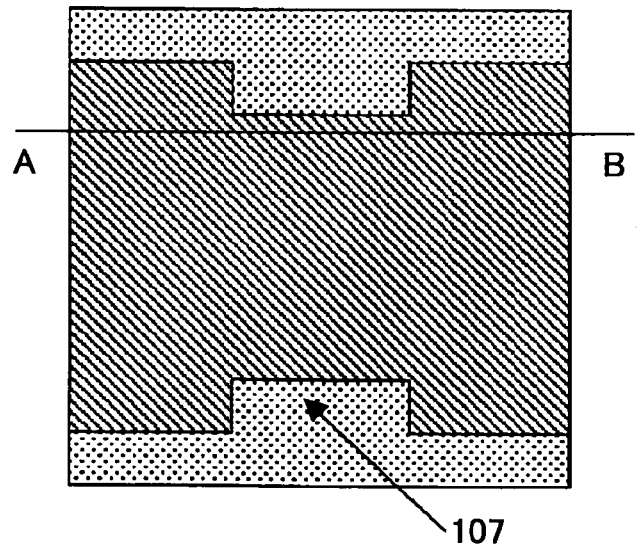

FIGS. 5A through 5D are cross-sectional views showing steps of forming the optical deflection device having the notches 107 in the mirror 106 according to a second embodiment of the present invention, where FIG. 5E is a plan view corresponding to FIG. 5D, which shows the cross-sectional view along a line AB in FIG. 5E.

As illustrated in FIG. 5A, a mask is formed on a substrate 101 (for example, a silicon wafer) by photolithography with an organic resist and a photo mask having grade levels. Afterwards, the silicon substrate 101 is etched to a thickness of 2.6 µm by RIE (Reactive Ion Etching) with a mixed gas of $SF_6$ and $O_2$, thereby, forming the ridge 105. Then, thermal oxidation is performed to form the insulating film 102 to a thickness of 500 nm on the ridge 105 and the silicon substrate 101.

As illustrated in FIG. 5B, a TiN film is formed to a thickness of 150 nm by sputtering, and is patterned by photolithography with an organic resist. Then, the TiN film is etched by RIE with a $Cl_2$ gas, thereby forming the electrodes 103. Further, the protection insulating film 104 is formed to a thickness of 250 nm with a mixed gas of $SiH_4$ and $N_2O$ by plasma CVD.

As illustrated in FIG. 5C, a poly-Si film acting as a sacrifice layer is formed to a thickness of 4.0 µm with a $SiH_4$ gas by thermal CVD, and is flattened by CMP (Chemical Mechanical Polishing).

As illustrated in FIG. 5D, a metal film, acting as the mirror 106, is formed from, for example, Al, or an Al—Ti alloy, or Cr, to a thickness of 100 nm. Then, the metal film is etched and patterned by photolithography and by RIE with a $Cl_2$ gas, thereby forming the notches 107 in the mirror 106, as illustrated in FIG. 5E.

Figure 6A:
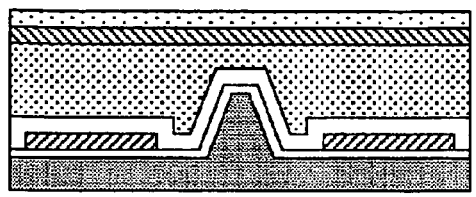
FIGS. 6A through 6E, continuing from FIGS. 5A through 5E, are cross-sectional views and plan views showing steps of forming the optical deflection device having notches in the mirror according to the second embodiment of the present invention.
Figure 6B:
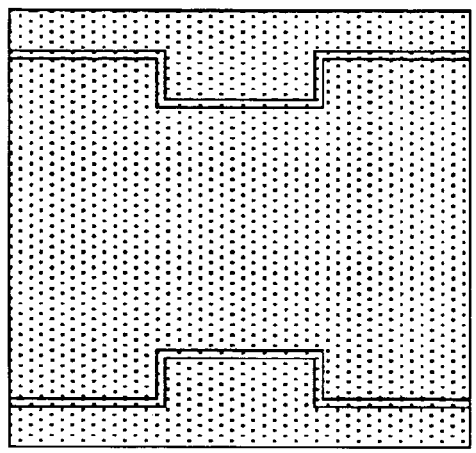
Figure 6C:
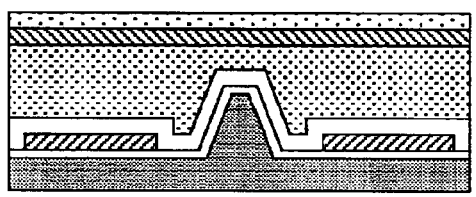
Figure 6D:
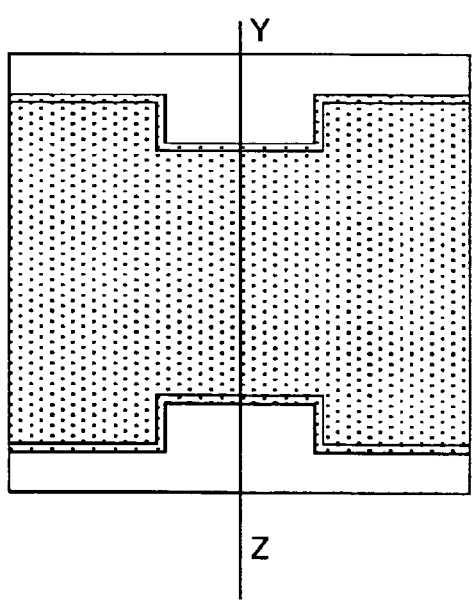
Figure 6E:
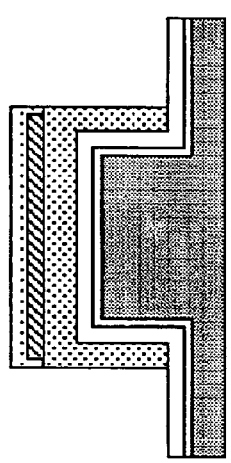

FIGS. 6A through 6E, continuing from FIGS. 5A through 5E, are cross-sectional views and plan views showing steps of forming the optical deflection device having the notches 107 in the mirror 106 according to the second embodiment of the present invention, where FIG. 6A is a cross-sectional view derived from the plan view in FIG. 6B, and FIG. 6C and FIG. 6E are cross-sectional views derived from the plan view in FIG. 6D. FIG. 6E shows the cross-sectional view along a line YZ in FIG. 6D.

As illustrated in FIG. 6A and FIG. 6B, continued from FIG. 5D and FIG. 5E, an amorphous silicon film is formed on the mirror 106 and the poly silicon layer by plasma CVD with a mixed gas of $SiH_4$ and $H_2$ to a thickness of 200 nm.

As illustrated in FIGS. 6C through 6E, the amorphous silicon layer and the poly silicon layer are patterned by photolithography and by RIE with a mixed gas of $SF_6$ and $O_2$.

Figure 7A:
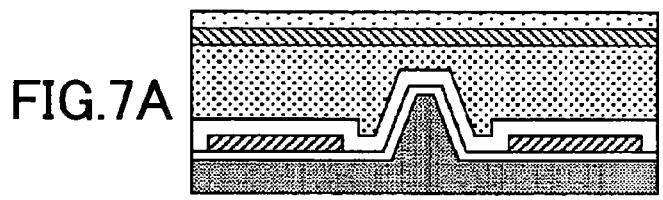
FIGS. 7A through 7F, continuing from FIGS. 6A through 6E, are cross-sectional views and plan views showing steps of forming the optical deflection device having the notches 107 in the mirror 106 according to the second embodiment of the present invention.
Figures 7B, 7C:
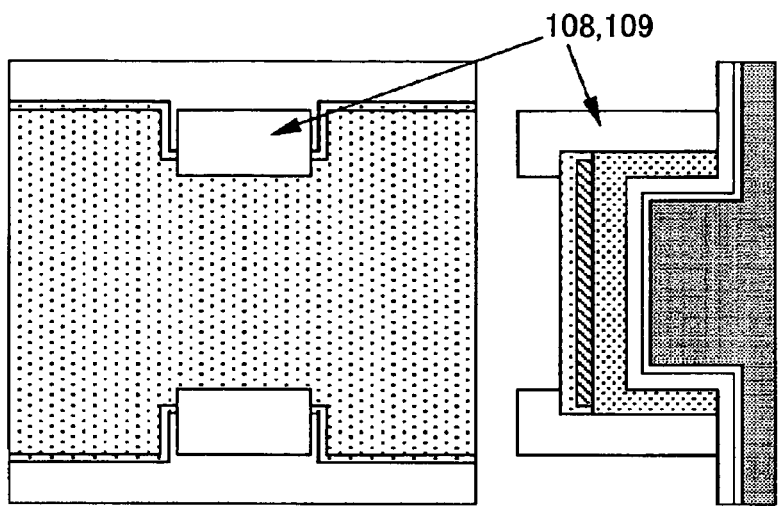
Figure 7D:
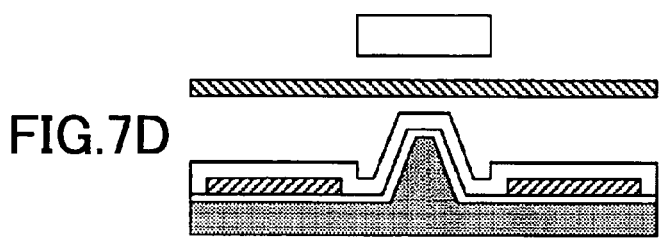
Figures 7E, 7F:
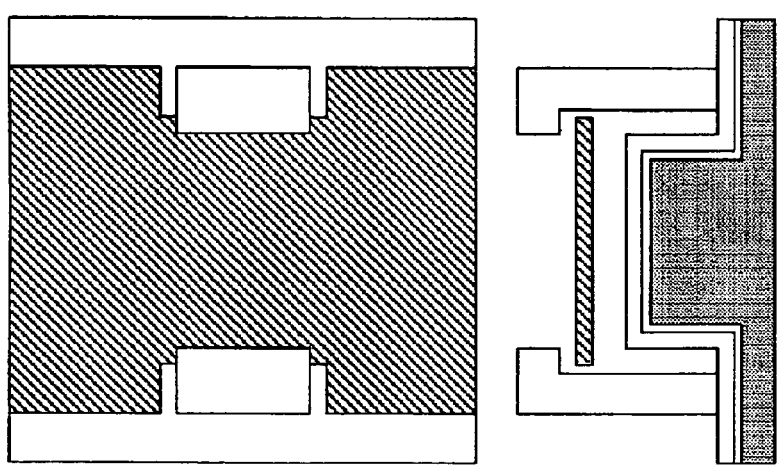

FIGS. 7A through 7F, continuing from FIGS. 6A through 6E, are cross-sectional views and plan views showing steps of forming the optical deflection device having the notches 107 in the mirror 106 according to the second embodiment of the present invention, where FIG. 7A and FIG. 7C are cross-sectional views derived from the plan view in FIG. 7B, and FIG. 7D and FIG. 7F are cross sectional views derived from the plan view in FIG. 7E.

As illustrated in FIGS. 7A through 7C, for example, a silicon oxide film acting as the bearing members 108 and 109 is formed by thermal CVD or plasma CVD with a mixed gas of $SiH_4$ and $N_2O$ to a thickness of 500 nm. At this moment, the silicon oxide film covers the step between the mirror member 106 and the amorphous silicon stacked on the mirror member 106. Then, the silicon oxide film is etched by photolithography and by RIE with a mixed gas of $CF_4$ and $H_2$. Hence, a pattern of the bearing members 108, 109 is formed. Then, an Al film is deposited to form pads used for interconnection bonding.

As illustrated in FIGS. 7D through 7F, the poly silicon layer, acting as the sacrifice layer, and the amorphous silicon layer are etched with TMAH (Tetramethylammonium hydroxide).

Figure 8:
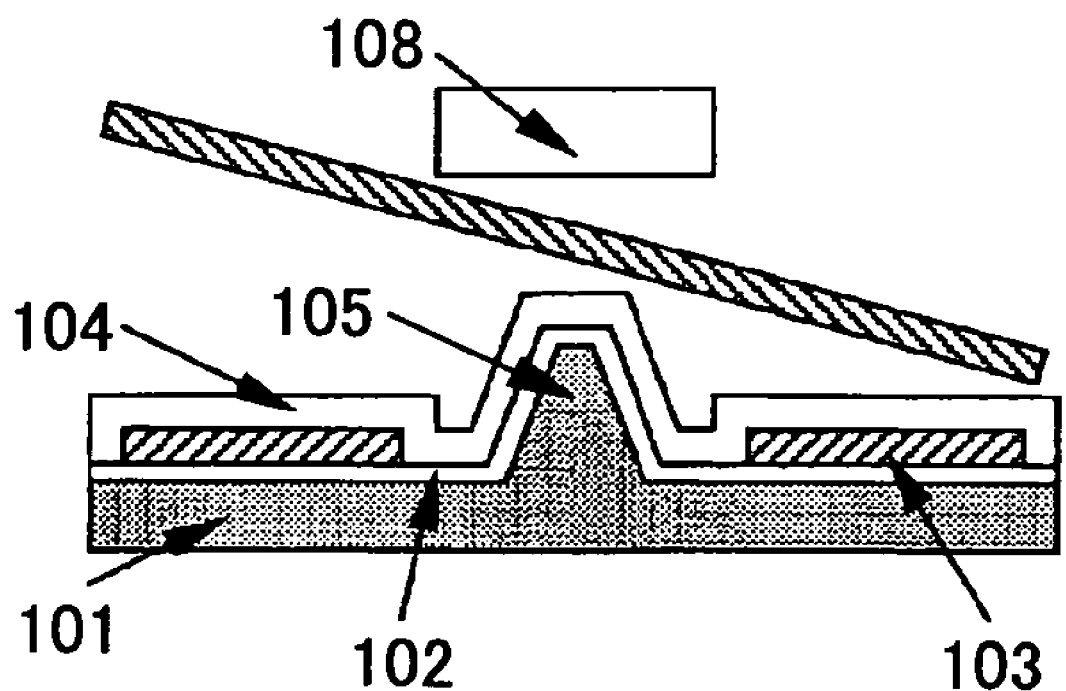
FIG. 8, continuing from FIGS. 7A through 7F, is a cross-sectional view of the optical deflection device having the notches 107 in the mirror 106 formed by the method of the second embodiment of the present invention.

FIG. 8, continuing from FIGS. 7A through 7F, is a cross-sectional view of the optical deflection device having the notches 107 in the mirror 106 formed by the method of the second embodiment of the present invention.

As illustrated in FIG. 8, the mirror 106 lies down on the ridge 105, and can rotate freely like a seesaw.

Third Embodiment

Below, a typical method of forming the ring mechanism for loosely fixing the mirror 106 is described with reference to FIGS. 9A through 9E, FIGS. 10A through 10E, FIGS. 11A through 11F, and FIG. 12. In the following description, it is assumed that the mirror is a 20 µm square, rectangular openings in the mirror 106 are 4 µm along the axle direction and 5 µm in the rotation direction, and the inclination angle of the mirror is 15°.

Figure 9A:
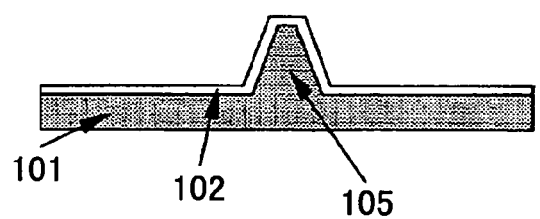
FIGS. 9A through 9E are cross-sectional views showing steps of forming the optical deflection device having the openings 122 and the ring mechanism on the mirror 106 according to a third embodiment of the present invention.
Figure 9B:
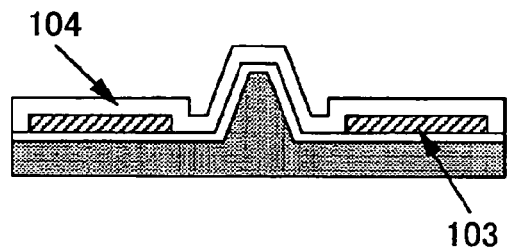
Figure 9C:
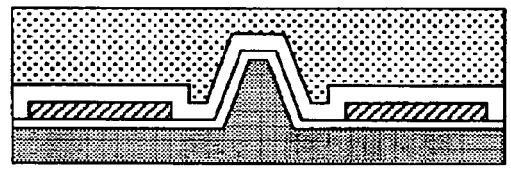
Figure 9D:
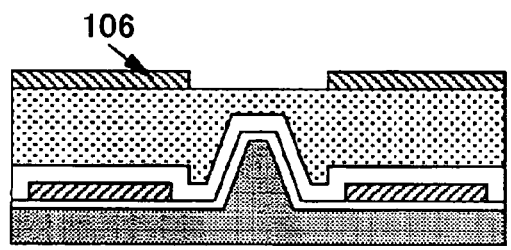
Figure 9E:
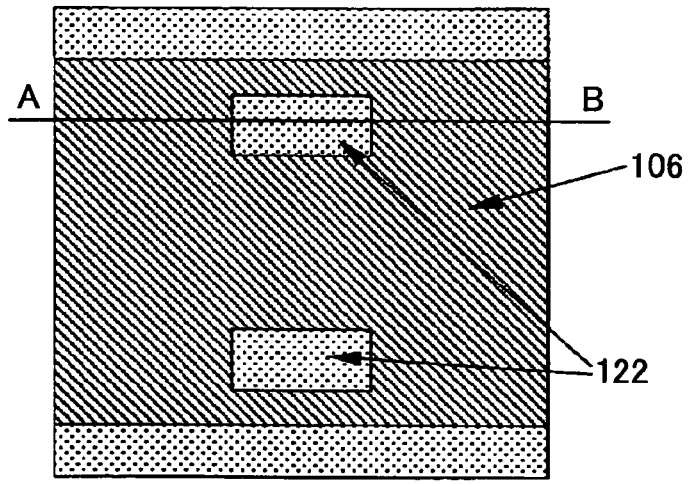

FIGS. 9A through 9D are cross-sectional views showing steps of forming the optical deflection device having the openings 122 and the ring mechanism on the mirror 106 according to a third embodiment of the present invention, where FIG. 9E is a plan view corresponding to FIG. 9D, which shows the cross-sectional view along a line AB in FIG. 9E.

As illustrated in FIG. 9A, a mask is formed on a substrate 101 (for example, a silicon wafer) by photolithography with an organic resist and a photo mask having grade levels. Afterwards, the silicon substrate 101 is etched to a thickness of 2.6 µm by RIE (Reactive Ion Etching) with a mixed gas of $SF_6$ and $O_2$, thereby forming the ridge 105. Then, thermal oxidation is performed to form the insulating film 102 to a thickness of 500 nm on the ridge 105 and the silicon substrate 101.

As illustrated in FIG. 9B, a TiN film is formed to a thickness of 150 nm by sputtering, and is patterned by photolithography with an organic resist. Then, the TiN film is etched by RIE with a $Cl_2$ gas, forming the electrodes 103. Further, the protection insulating film 104 is formed to a thickness of 250 nm with a mixed gas of $SiH_4$ and $N_2O$ by plasma CVD.

As illustrated in FIG. 9C, a poly-Si film acting as a sacrifice layer is formed to a thickness of 4.0 µm with a $SiH_4$ gas by thermal CVD, and is flattened by CMP (Chemical Mechanical Polishing).

As illustrated in FIG. 9D, a metal film, acting as the mirror 106, is formed from, for example, Al, or an Al—Ti alloy, or Cr, to a thickness of 100 nm. Then the metal film is etched and patterned by photolithography and by RIE with a $Cl_2$ gas, thereby forming the openings 122 in the mirror 106, as illustrated in FIG. 9E.

Figure 10A:
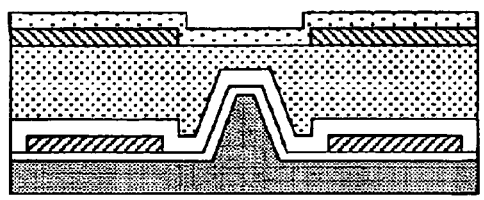
FIGS. 10A through 10E, continuing from FIGS. 9A through 9E, are cross-sectional views and plan views showing steps of forming the optical deflection device having the openings 122 in the mirror 106 according to the third embodiment of the present invention.

FIGS. 10A through 10E, continuing from FIGS. 9A through 9E, are cross-sectional views and plan views showing steps of forming the optical deflection device having the openings 122 in the mirror 106 according to the third embodiment of the present invention, where FIG. 10A is a cross-sectional view derived from the plan view in FIG.

Figure 10B:
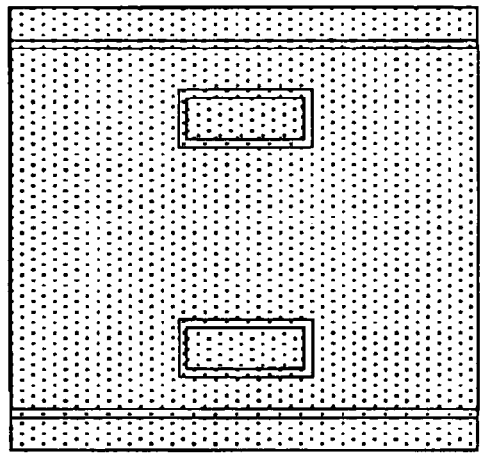
Figure 10C:
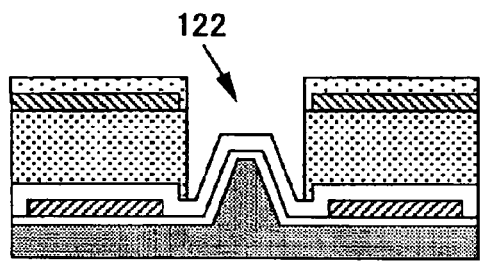
Figure 10D:
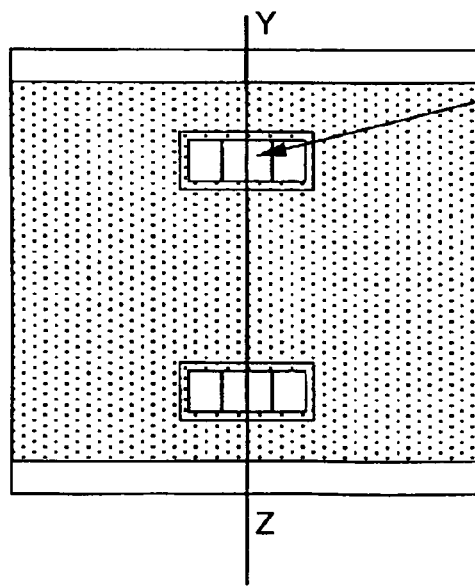
Figure 10E:
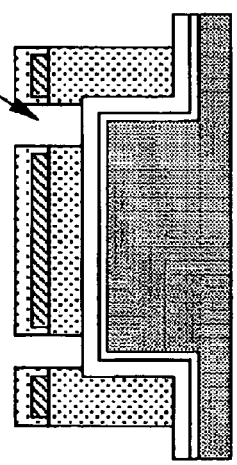

10B, FIG. 10C and FIG. 10E are cross-sectional views derived from the plan view in FIG. 10D, and FIG. 10E shows the cross-sectional view along a line YZ in FIG. 10D.

As illustrated in FIG. 10A and FIG. 10B, continued from FIG. 9D and FIG. 9E, an amorphous silicon film is formed on the mirror 106 and the poly silicon layer by plasma CVD with a mixed gas of $SiH_4$ and $H_2$.

As illustrated in FIGS. 10C through 10E, the amorphous silicon and the poly silicon layer are patterned by photolithography and by RIE with a mixed gas of $SF_6$ and $O_2$.

Figure 11A:
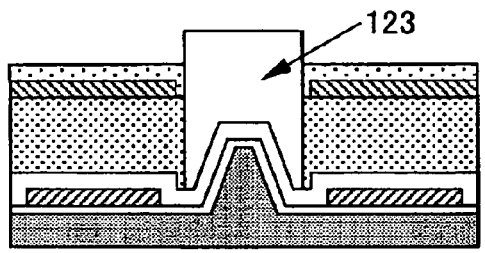
FIGS. 11A through 11F, continuing from FIGS. 10A through 10E, are cross-sectional views and plan views showing steps of forming the optical deflection device having the openings 122 in the mirror 106 according to the third embodiment of the present invention.
Figure 11B:
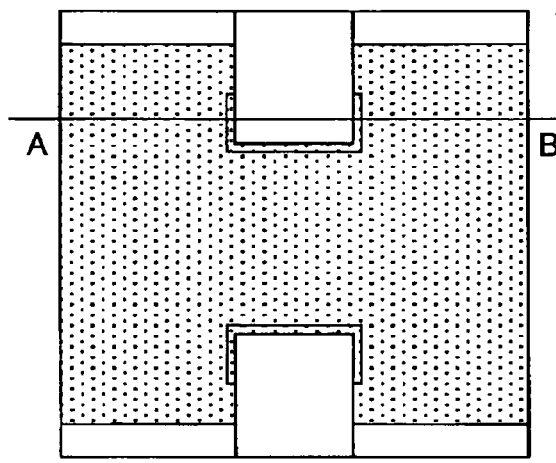
Figure 11C:
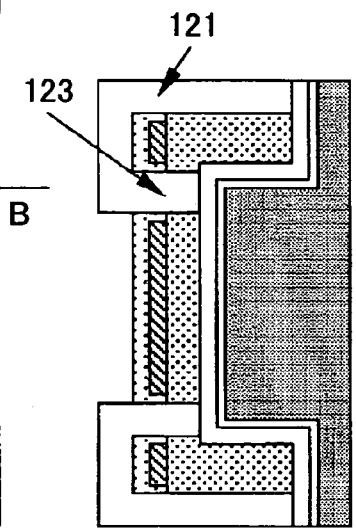
Figure 11D:
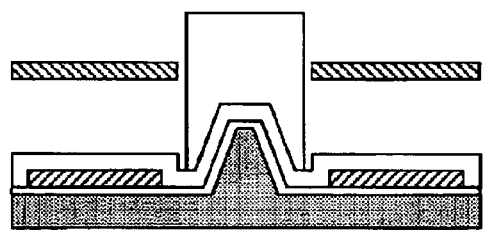
Figure 11E:
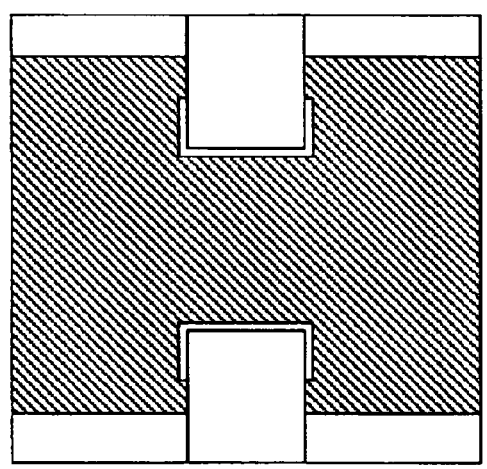
Figure 11F:
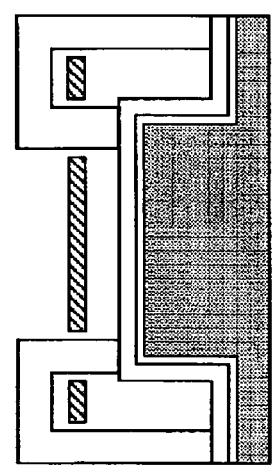

FIGS. 11A through 11F, continuing from FIGS. 10A through 10E, are cross-sectional views and plan views showing steps of forming the optical deflection device having the openings 122 in the mirror 106 according to the third embodiment of the present invention, where, FIG. 11A and FIG. 11C are cross-sectional views derived from the plan view in FIG. 11B, and FIG. 11D and FIG. 11F are cross-sectional views derived from the plan view in FIG. 1E.

As illustrated in FIGS. 11A through 11C, for example, a silicon oxide film acting as the bearing members 121 and 123 is formed by thermal CVD or plasma CVD with a mixed gas of $SiH_4$ and $N_2O$ to a thickness of 500 nm. At this moment, the silicon oxide film covers the step between the mirror member 106 and the amorphous silicon stacked on the mirror member 106. Then the silicon oxide film is etched by photolithography and by RIE with a mixed gas of $CF_4$ and $H_2$. Hence a pattern of the bearing members 121, 123 is formed. Then an Al film is deposited to form pads used for interconnection bonding.

As illustrated in FIGS. 11D through 11F, the poly silicon layer, acting as the sacrifice layer, and the amorphous silicon layer are etched with TMAH (Tetramethylammonium hydroxide).

Figure 12:
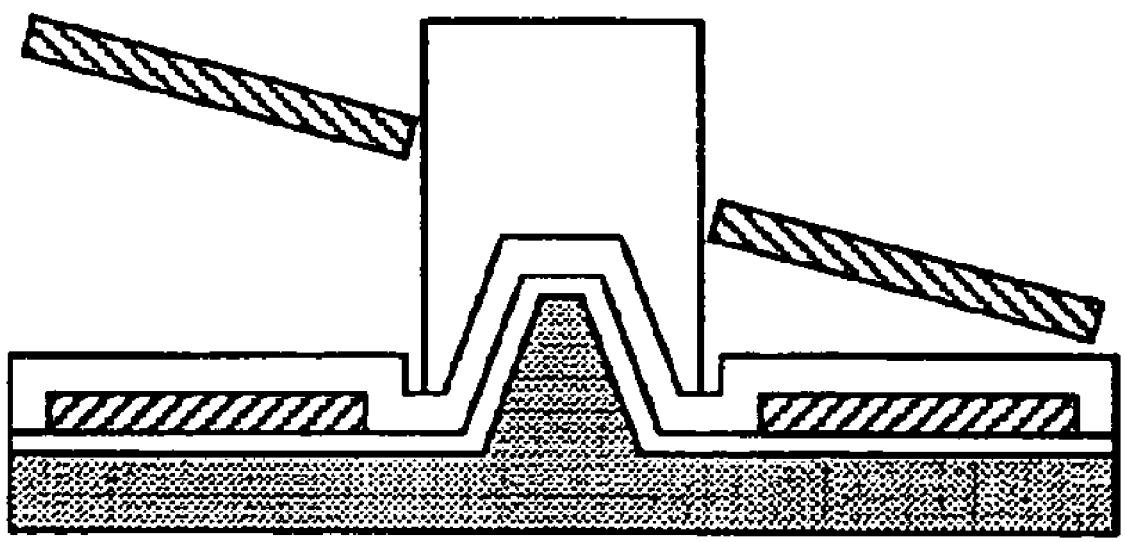
FIG. 12, continuing from FIGS. 11D through 11F, is a cross-sectional view of the optical deflection device having the openings 122 in the mirror 106 formed by the method of the third embodiment of the present invention.

FIG. 12, continuing from FIGS. 11D through 11F, is a cross-sectional view of the optical deflection device having the openings 122 in the mirror 106 formed by the method of the third embodiment of the present invention.

As illustrated in FIG. 12, the mirror 106 lies down on the ridge 105, and can rotate freely like a seesaw.

Fourth Embodiment

Below, a typical method of forming the projections 132 constituting a bearing structure for loosely fixing the mirror 106 is described with reference to FIGS. 13A through 13E, FIGS. 14A through 14E, FIGS. 15A through 15F, and FIG. 16. In the following description, it is assumed that the mirror is a 20 µm square, each of the projections 132 is 5 µm in width and 5 µm in the projecting length, and the inclination angle of the mirror is 150.

Figure 13A:
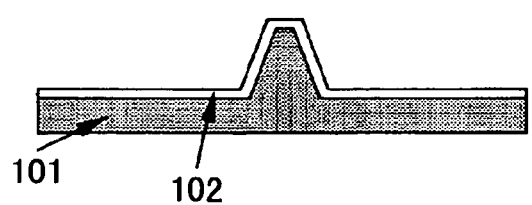
FIGS. 13A through 13E are cross-sectional views showing steps of forming the optical deflection device having the projections 132 on the sides of the mirror 106 according to a fourth embodiment of the present invention.
Figure 13B:
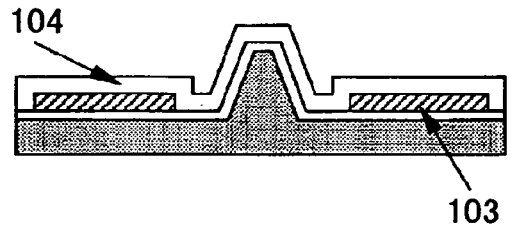
Figure 13C:
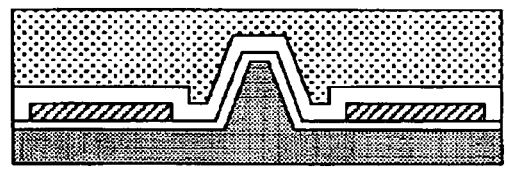
Figure 13D:
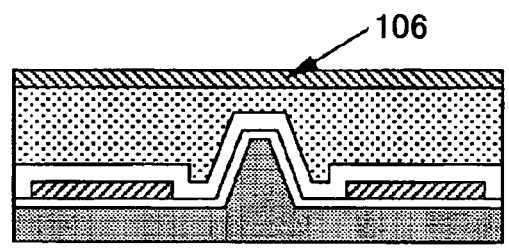
Figure 13E:
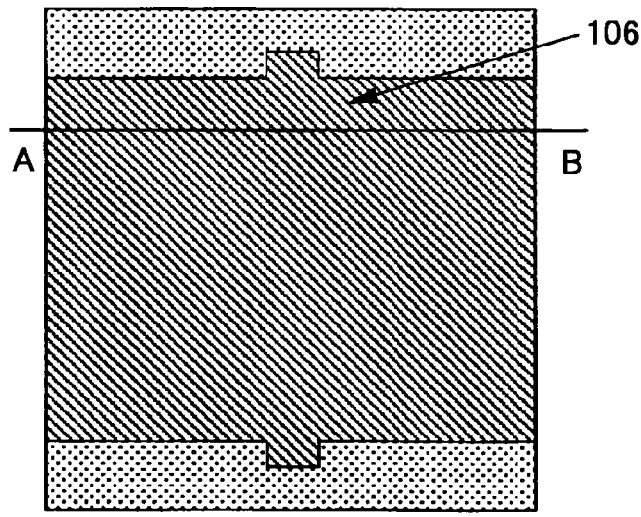

FIGS. 13A through 13D are cross-sectional views showing steps of forming the optical deflection device having the projections 132 on the sides of the mirror 106 according to a fourth embodiment of the present invention, where FIG. 13E is a plan view corresponding to FIG. 13D, which shows the cross-sectional view along a line AB in FIG. 13E.

As illustrated in FIG. 13A, a mask is formed on a substrate 101 (for example, a silicon wafer) by photolithography with an organic resist and a photo mask having grade levels. Afterwards, the silicon substrate 101 is etched to a thickness of 2.6 µm by RIE (Reactive Ion Etching) with a mixed gas of $SF_6$ and $O_2$, thereby forming the ridge 105. Then, thermal oxidation is performed to form the insulating film 102 to a thickness of 500 nm on the ridge 105 and the silicon substrate 101.

As illustrated in FIG. 13B, a TiN film is formed to a thickness of 150 nm by sputtering, and is patterned by photolithography with an organic resist. Then, the TiN film is etched by RIE with a $Cl_2$ gas, forming the electrodes 103.

Further, the protection insulating film 104 is formed to a thickness of 250 nm with a mixed gas of $SiH_4$ and $N_2O$ by plasma CVD.

As illustrated in FIG. 13C, a poly-Si film acting as a sacrifice layer is formed to a thickness of 4.0 µm with a $SiH_4$ gas by thermal CVD, and is flattened by CMP (Chemical Mechanical Polishing).

As illustrated in FIG. 13D, a metal film, acting as the mirror 106, is formed from, for example, Al, or an Al—Ti alloy, or Cr, to a thickness of 100 nm. Then, the metal film is etched and patterned by photolithography and by RIE with a $Cl_2$ gas, thereby, forming the projections 132 on the sides of the mirror 106 in the horizontal direction, as illustrated in FIG. 13E.

FIGS. 14A through 14E, continuing from FIGS. 13A through 13E, are cross-sectional views and plan views showing steps of forming the optical deflection device having the projections 132 on the sides of the mirror 106 according to the fourth embodiment of the present invention, where, FIG. 14A is a cross-sectional view derived from the plan view in FIG. 14B, FIG. 14C and FIG. 14E are cross-sectional views derived from the plan view in FIG. 14D, and FIG. 14E shows the cross-sectional view along a line YZ in FIG. 14D.

As illustrated in FIG. 14A and FIG. 14B, continued from FIG. 13D and FIG. 13E, an amorphous silicon film is formed on the mirror 106 and the poly silicon layer by plasma CVD with a mixed gas of $SiH_4$ and $H_2$.

As illustrated in FIGS. 14C through 14E, the amorphous silicon and the poly silicon layer are patterned by photolithography and by RIE with a mixed gas of $SF_6$ and $O_2$.

Figure 15A:
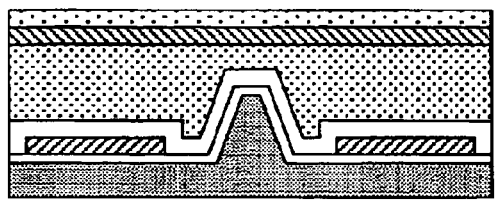
FIGS. 15A through 15F, continuing from FIGS. 14C through 14E, are cross-sectional views and plan views showing steps of forming the optical deflection device having the projections 132 on the sides of the mirror 106 according to the fourth embodiment of the present invention.
Figure 15B:
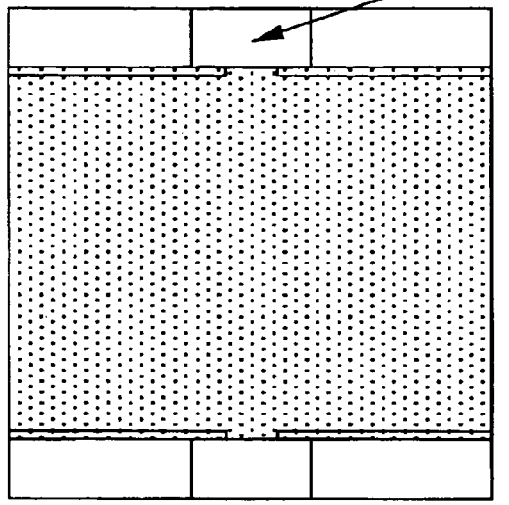
Figure 15C:
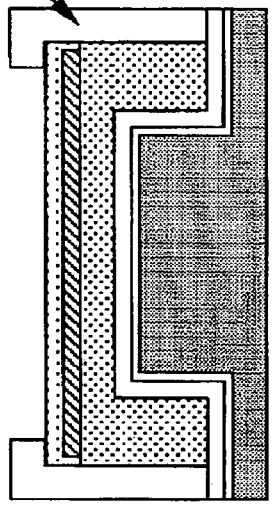
Figure 15D:
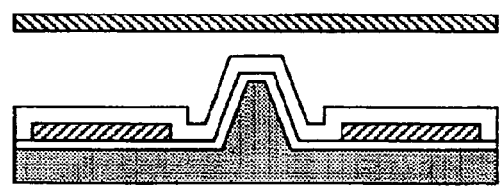
Figure 15E:
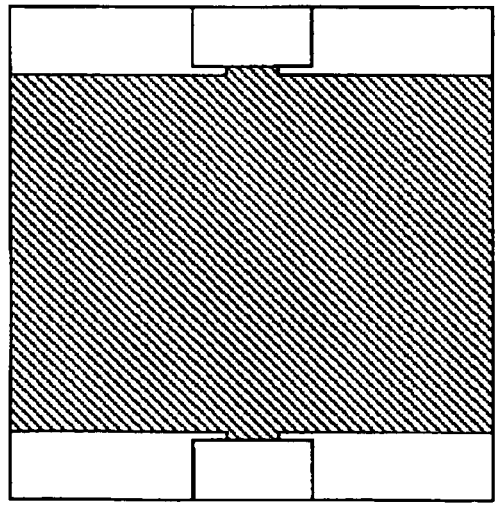
Figure 15F:
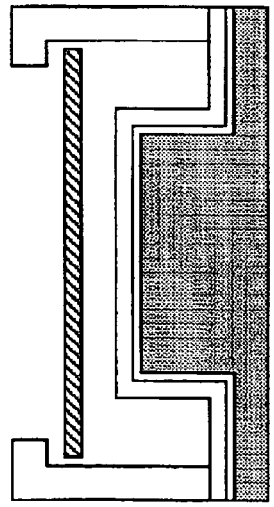

FIGS. 15A through 15F, continuing from FIGS. 14C through 14E, are cross-sectional views and plan views showing steps of forming the optical deflection device having the projections 132 on the sides of the mirror 106 according to the fourth embodiment of the present invention, where FIG. 15A and FIG. 15C are cross-sectional views derived from the plan view in FIG. 15B, and FIG. 15D and FIG. 15F are cross-sectional views derived from the plan view in FIG. 15E.

As illustrated in FIGS. 15A through 15C, for example, a silicon oxide film acting as the bearing member 131 is formed by thermal CVD or plasma CVD with a mixed gas of $SiH_4$ and $N_2O$ to a thickness of 1.0 µm. At this moment, the silicon oxide film covers the step between the mirror member 106 and the amorphous silicon stacked on the mirror member 106. Then, the silicon oxide film is etched by photolithography and by RIE with a mixed gas of $CF_4$ and $H_2$. Hence, a pattern of the bearing member 131 is formed. Then, an Al film is deposited to form pads used for interconnection bonding.

As illustrated in FIGS. 15D through 15F, the poly silicon layer, acting as the sacrifice layer, and the amorphous silicon layer are etched with TMAH (Tetramethylammonium hydroxide).

Figure 16:
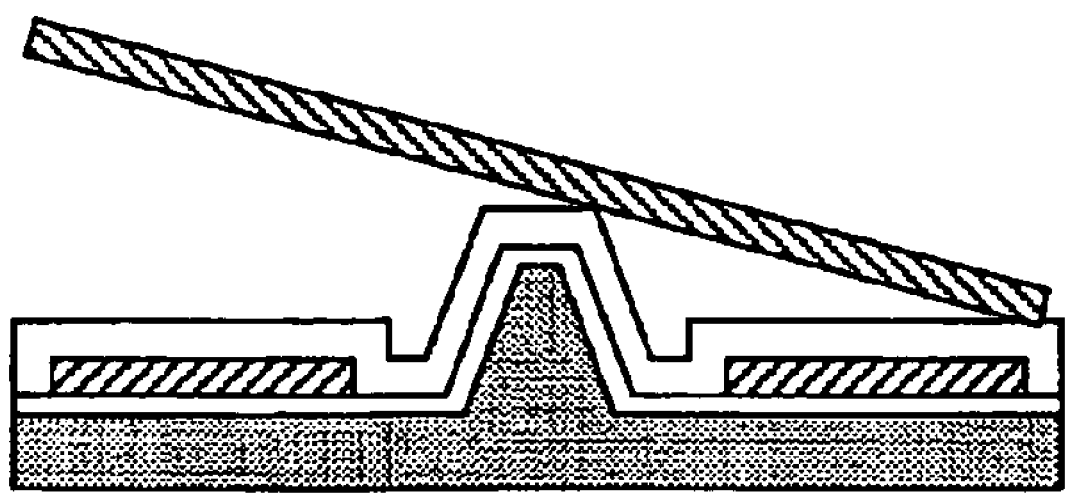
FIG. 16, continuing from FIGS. 15D through 15F, is a cross-sectional view of the optical deflection device having the projections 132 on the sides of the mirror 106 formed by the method of the fourth embodiment of the present invention.

FIG. 16, continuing from FIGS. 15D through 15F, is a cross-sectional view of the optical deflection device having the projections 132 on the sides of the mirror 106 formed by the method of the fourth embodiment of the present invention.

As illustrated in FIG. 16, the mirror 106 lies down on the ridge 105, and can rotate freely like a seesaw.

Fifth Embodiment

Figure 17A:
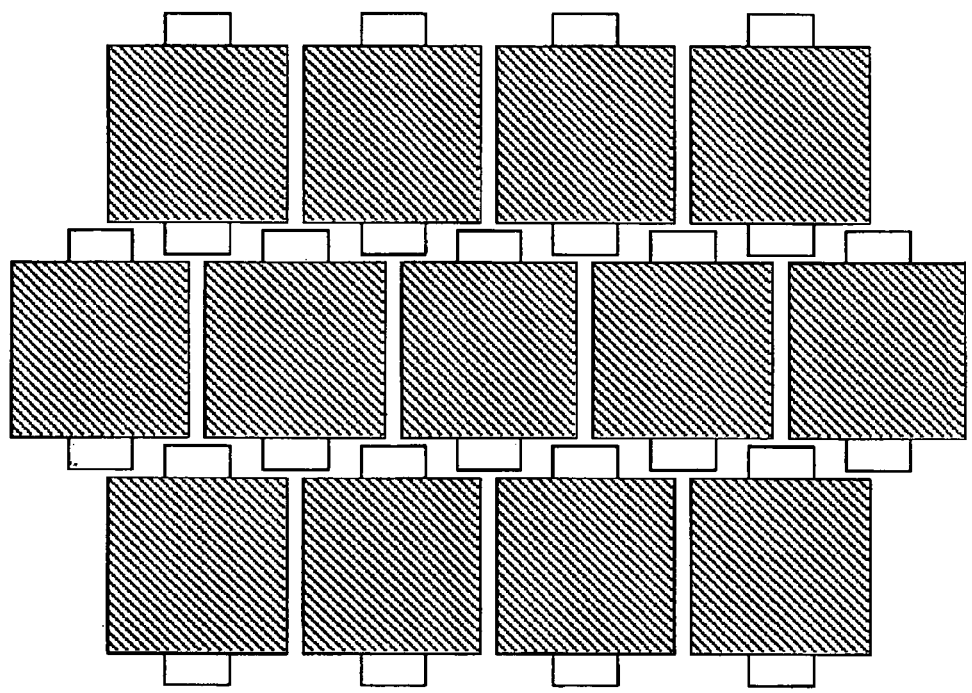
FIG. 17A is a plan view schematically showing an optical deflection system arranged in a zigzag manner according to a fifth embodiment of the present invention.

FIG. 17A is a plan view schematically showing an optical deflection system arranged in a zigzag manner according to a fifth embodiment of the present invention.

Figure 17B:
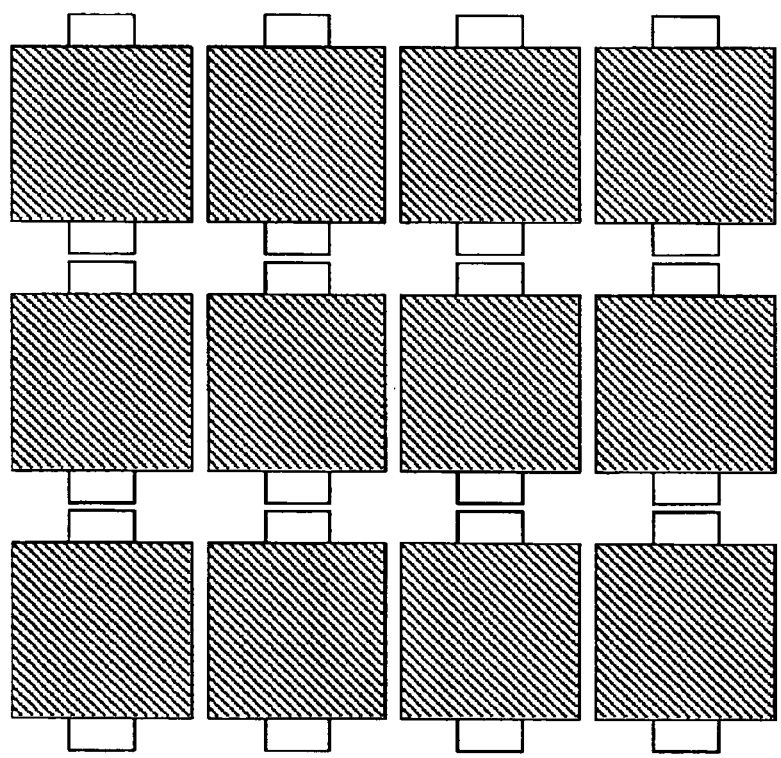
FIG. 17B is a plan view showing an optical deflection system in the related art for comparison with the present invention.

FIG. 17B is a plan view showing an optical deflection system in the related art for comparison with the arrangement in FIG. 17A.

When plural optical deflection devices are arranged on a substrate, if bearings are used for loosely fixing the mirrors, the bearings occupy certain spaces. If the optical deflection devices are uniformly arranged with the bearings of different optical deflection devices facing each other, the efficiency of space utilization decreases, and density of the mirrors decreases, as illustrated in FIG. 17B.

According to the present embodiment, as illustrated in FIG. 17A, the optical deflection devices are arranged on a substrate in a zigzag manner, thereby, unused space is reduced, and this prevents reduction of the density of the mirrors on the substrate, and further, this improves light reflection efficiency when the optical deflection is used in a display.

While the present invention has been described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2004-001239 filed on Jan. 6, 2004, the entire contents of which are hereby incorporated by reference.

What is claimed is:

1. An optical deflection device which displaces a member having a light reflection region by an electrostatic force so as to deflect a reflection direction of a light beam incident on the light reflection region, the optical deflection device comprising:
   a substrate;
   a plurality of regulating members that are provided at a plurality of ends of the substrate, each of the regulating members having a stopper at an upper portion thereof;
   a fulcrum member that has a vertex and is provided on an upper surface of the substrate;
   a plate-shaped member that has the light reflection region formed thereon and has a conductive layer including a conductive member, said plate-shaped member not having any fixed ends, said plate-shaped member being movably arranged in a space between the substrate, the fulcrum member, and the stoppers; and
   a plurality of electrodes that are provided on the substrate and substantially face the conductive layer of the plate-shaped member;
   wherein the plate-shaped member has a first rotational bearing that provides a degree of freedom of the plate-shaped member to rotate toward the substrate.

2. The optical deflection device as claimed in claim 1, wherein a supporting member is provided at a position corresponding to the center of gravity of the plate-shaped member.

3. The optical deflection device as claimed in claim 1, wherein a second rotational bearing is provided at a position corresponding to the center of gravity of the plate-shaped member.

4. The optical deflection device as claimed in claim 1, wherein a supporting member is provided near a rotationally symmetric axis of the plate-shaped member.

5. The optical deflection device as claimed in claim 1, wherein a third rotational bearing is provided near a rotationally symmetric axis of the plate-shaped member.

6. The optical deflection device as claimed in claim 1, wherein a notch is formed in the plate-shaped member.

7. The optical deflection device as claimed in claim 1, wherein an opening is formed in the plate-shaped member.

8. The optical deflection device as claimed in claim 7, wherein a peripheral portion of the opening is transparent.

9. The optical deflection device as claimed in claim 1, wherein a projecting portion is formed on a side surface of the plate-shaped member.

10. An optical deflection system including a plurality of optical deflection devices arranged in a zigzag manner, wherein
   each of the optical deflection devices displaces a member having a light reflection region by an electrostatic force so as to deflect a reflection direction of a light beam incident on the light reflection region, and
   the optical deflection device comprises:
   a substrate;
   a plurality of regulating members that are provided at a plurality of ends of the substrate, each of the regulating members having a stopper at an upper portion thereof;
   a fulcrum member that has a vertex and is provided on an upper surface of the substrate;
   a plate-shaped member that has the light reflection region formed thereon and has a conductive layer including a conductive member, said plate-shaped member not having any fixed ends, said plate-shaped member being movably arranged in a space between the substrate, the fulcrum member, and the stoppers, the plate-shaped member having a rotational bearing that provides a degree of freedom of the plate-shaped member to rotate toward the substrate; and
   a plurality of electrodes that are provided on the substrate and substantially face the conductive layer of the plate-shaped member.

* * * * *